(12) United States Patent
Adcock et al.

(10) Patent No.: US 11,601,619 B2
(45) Date of Patent: Mar. 7, 2023

(54) AGGREGATED VIRTUAL SESSION FOR MULTIPLE VIRTUAL SESSIONS

(71) Applicant: Capital One Services, LLC, McLean, VA (US)

(72) Inventors: Lee Adcock, Midlothian, VA (US); Vamsi Kavuri, Richmond, VA (US); Jignesh Rangwala, Glen Allen, VA (US); Mehulkumar Jayantilal Garnara, Glen Allen, VA (US); Muthukumaran Vembuli, Glen Allen, VA (US); Santhi Sridharan, Glen Allen, VA (US); Soumyajit Ray, Glen Allen, VA (US); Steven Voltz, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/449,700

(22) Filed: Oct. 1, 2021

(65) Prior Publication Data

US 2022/0210371 A1    Jun. 30, 2022

Related U.S. Application Data

(63) Continuation of application No. 17/139,456, filed on Dec. 31, 2020, now Pat. No. 11,140,358.

(51) Int. Cl.
*H04N 7/15* (2006.01)
*H04N 21/4788* (2011.01)
(Continued)

(52) U.S. Cl.
CPC ............... *H04N 7/15* (2013.01); *G06F 9/542* (2013.01); *G06Q 10/1095* (2013.01);
(Continued)

(58) Field of Classification Search
CPC .... H04N 7/15; H04N 21/4788; H04N 21/472; H04N 21/433; G06Q 10/10; G06F 21/433
(Continued)

(56) References Cited

U.S. PATENT DOCUMENTS 10,070,093 B1    9/2018  Faulkner
11,140,358 B1    10/2021 Adcock
(Continued)

OTHER PUBLICATIONS

Extended European Search Report for Application No. EP21218432.9, dated Sep. 14, 2022, 17 pages.
(Continued)

*Primary Examiner* — Melur Ramakrishnaiah
(74) *Attorney, Agent, or Firm* — Harrity & Harrity, LLP

(57) ABSTRACT

In some implementations, a system may retrieve an electronic calendar associated with a user. The system may identify, based on the electronic calendar, a plurality of virtual sessions. The system may generate an electronic invitation to join an aggregated virtual session for the plurality of virtual sessions. The system may transmit the electronic invitation to a client device associated with the user. The system may receive, from the client device, a selection of the electronic invitation. The system may establish, based on the electronic invitation, the aggregated virtual session for the client device that enables the client device to connect to each of the plurality of virtual sessions associated with the aggregated virtual session.

20 Claims, 8 Drawing Sheets

(51) Int. Cl.
   *G06Q 10/1093*   (2023.01)
   *H04N 21/472*    (2011.01)
   *G06F 9/54*      (2006.01)
   *H04N 21/433*    (2011.01)

(52) U.S. Cl.
   CPC ..... *H04N 21/4334* (2013.01); *H04N 21/4788* (2013.01); *H04N 21/47217* (2013.01)

(58) Field of Classification Search
   USPC .......................................... 348/14.01–14.16
   See application file for complete search history.

(56) References Cited

U.S. PATENT DOCUMENTS

| | | | |
|---|---|---|---|
| 2007/0239825 A1* | 10/2007 | Walter | H04N 21/6125 |
| | | | 709/219 |
| 2009/0157469 A1 | 6/2009 | D'Urso et al. | |
| 2011/0022968 A1 | 1/2011 | Conner et al. | |
| 2014/0286485 A1 | 9/2014 | Daye et al. | |
| 2014/0320588 A1 | 10/2014 | Midtun et al. | |
| 2016/0099986 A1 | 4/2016 | Bentley et al. | |
| 2017/0374425 A1* | 12/2017 | Disley | G06F 3/04842 |
| 2018/0012191 A1* | 1/2018 | Rosenberg | H04L 67/01 |
| 2018/0191907 A1 | 7/2018 | Herrin et al. | |

OTHER PUBLICATIONS

Partial European Search Report for Application No. EP21218432.9, dated Jun. 14, 2022, 17 pages.

\* cited by examiner

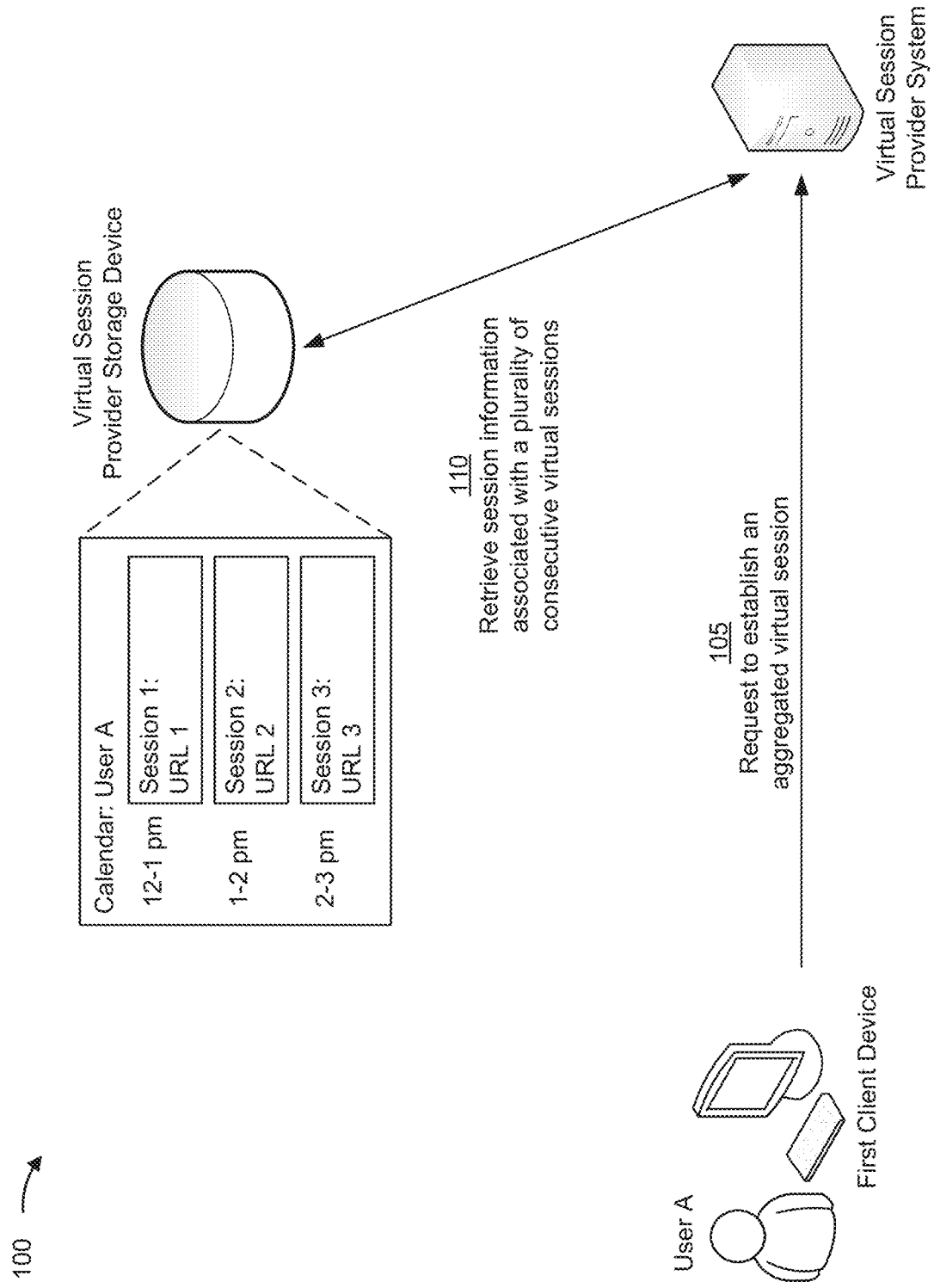

AGGREGATED VIRTUAL SESSION FOR MULTIPLE VIRTUAL SESSIONS

RELATED APPLICATION

This application is a continuation of U.S. patent application Ser. No. 17/139,456, filed Dec. 31, 2020 (now U.S. Pat. No. 11,140,358), which is incorporated herein by reference in its entirety.

BACKGROUND

Video conferencing involves the reception and transmission of audio-video signals by users at different locations, which enables communication between the users in real time. Video conferencing may be supported using a wide variety of devices, such as mobile phones, desktop computers, laptop computers, tablet computers, and/or smart televisions. Video conferencing may be useful in a workplace environment, in which users are located in different geographical regions. Video conferencing may provide other features, such as screen sharing, chat, meeting recording and transcription, etc.

SUMMARY

In some implementations, a system for establishing an aggregated virtual session includes one or more memories; and one or more processors, communicatively coupled to the one or more memories, configured to: receive an electronic request to establish an aggregated virtual session for a plurality of virtual sessions; retrieve session information associated with the plurality of virtual sessions, wherein session information for each virtual session in the plurality of virtual sessions includes: a scheduled start time and a scheduled end time associated with the virtual session, and login information for the virtual session; generate an electronic invitation to join the aggregated virtual session for the plurality of virtual sessions based on the session information associated with the plurality of virtual sessions; transmit the electronic invitation to a client device; receive, from the client device, a selection of the electronic invitation; and establish, based on the electronic invitation, the aggregated virtual session for the client device that enables the client device to connect to each of the plurality of virtual sessions associated with the aggregated virtual session.

In some implementations, a method of establishing an aggregated virtual session includes retrieving, by a system, an electronic calendar associated with a user; identifying, by the system and based on the electronic calendar, a plurality of virtual sessions; generating, by the system, an electronic invitation to join an aggregated virtual session for the plurality of virtual sessions; transmitting, by the system, the electronic invitation to a client device associated with the user; receiving, by the system and from the client device, a selection of the electronic invitation; and establishing, by the system and based on the electronic invitation, the aggregated virtual session for the client device that enables the client device to connect to each of the plurality of virtual sessions associated with the aggregated virtual session.

In some implementations, a non-transitory computer-readable medium storing a set of instructions includes one or more instructions that, when executed by one or more processors of a device, cause the device to: receive an electronic request to establish an aggregated virtual session for a plurality of virtual sessions; retrieve session information associated with the plurality of virtual sessions, wherein session information for each virtual session in the plurality of virtual sessions includes: a scheduled start time and a scheduled end time associated with the virtual session, and login information for the virtual session; generate an electronic invitation to join the aggregated virtual session for the plurality of virtual sessions based on the session information associated with the plurality of virtual sessions; and establish, based on the electronic invitation, the aggregated virtual session that enables a client device to connect to each of the plurality of virtual sessions associated with the aggregated virtual session.

BRIEF DESCRIPTION OF THE DRAWINGS

FIGS. 1A-1E are diagrams of an example implementation relating to an aggregated virtual session for a plurality of virtual sessions.

DETAILED DESCRIPTION

Figure 1B:
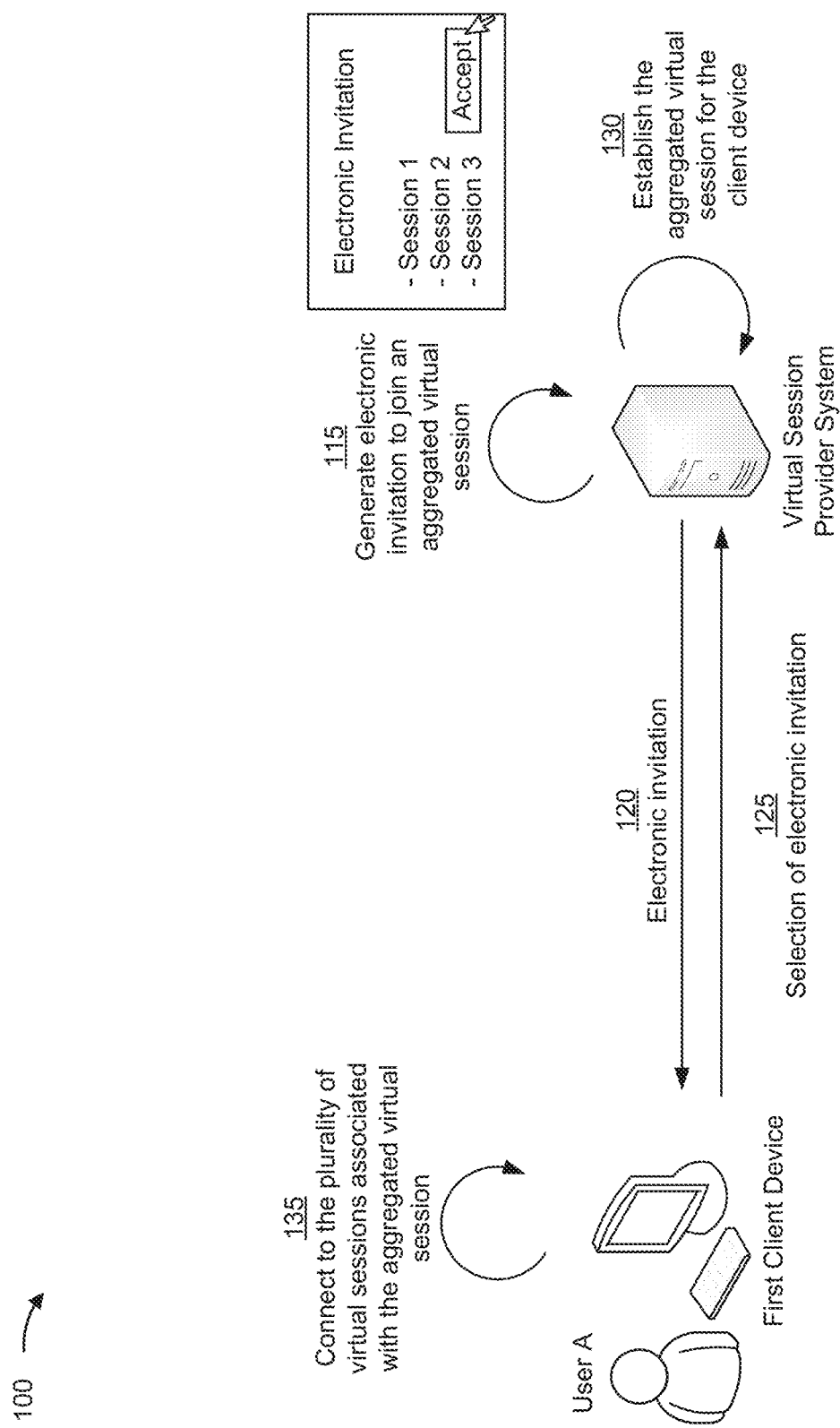
Figure 1C:
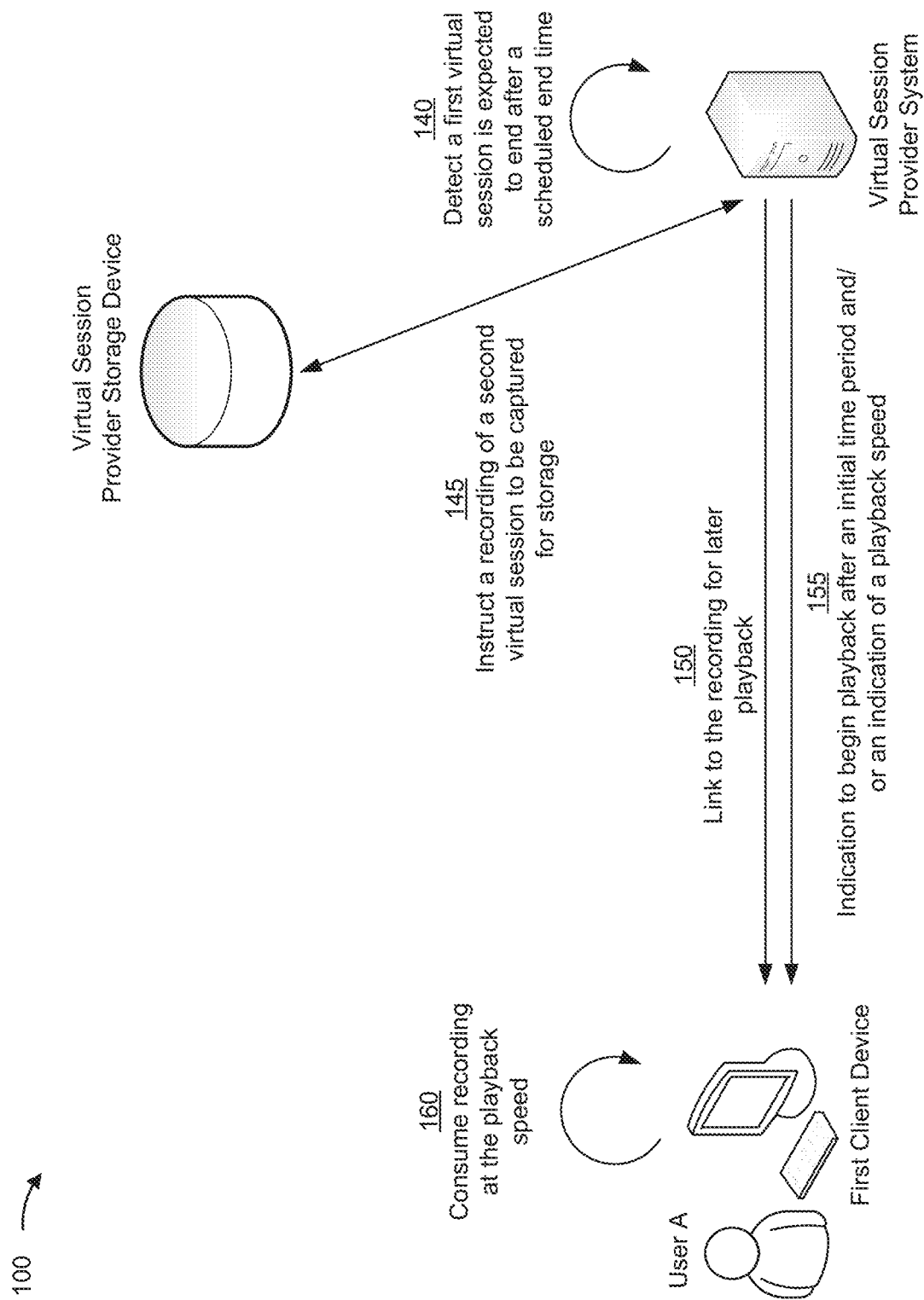

The following detailed description of example implementations refers to the accompanying drawings. The same reference numbers in different drawings may identify the same or similar elements.

Video conferencing allows users to communicate and collaborate through virtual sessions (or virtual meetings), without the need for the users to be present at a common physical location. For example, users that work remotely from other users may still work together through video conferencing.

One problem associated with video conferencing is that a user often may juggle between back-to-back or consecutive virtual sessions, or between virtual sessions with a relatively small time gap (e.g., 5 minutes to 15 minutes) between the virtual sessions. The user may finish a first virtual session and may quickly need to find an electronic invitation associated with a second virtual session. In some cases, virtual sessions may have a relatively small time overlap (e.g., the first virtual session may overlap ten minutes with the second virtual session). The electronic invitation associated with the second virtual session may be a second electronic invitation, and the second electronic invitation may be different than a first electronic invitation associated with the first virtual session. The second electronic invitation may include session information, such as an electronic link, login or dial-in information, a session identifier, and/or a session pin to connect to the second virtual session. The session information associated with the second electronic invitation may be different than session information associated with the first electronic invitation. Thus, when the first virtual session ends and the user has the second virtual session that is starting after the first virtual session, the user may spend an inordinate amount of time looking for the second electronic invitation and identifying the session information associated with the second electronic invitation.

Another problem associated with video conferencing is that when the user joins the second virtual session late, the user may be unaware of a conversation that occurred during the second virtual session before the user joined. Without an awareness of topics or points of order discussed during the conversation that occurred during a portion (e.g., a beginning) of the second virtual session that was missed by the user, the user may be disadvantaged when joining the second virtual session late.

In some implementations, to solve the problems described above, as well as a related technical problem of how to automatically establish multiple (e.g., a plurality of) virtual sessions for a client device using a single virtual session, a technical solution is described herein in which an electronic invitation may be created to allow the client device to join an aggregated virtual session for a plurality of virtual sessions. The electronic invitation may be created by retrieving and incorporating session information associated with the plurality of virtual sessions into the electronic invitation. The aggregated virtual session may enable the client device of a user to join the plurality of virtual sessions. The plurality of virtual sessions may be consecutive or back-to-back virtual sessions. Alternatively, the plurality of virtual sessions may be non-consecutive virtual sessions. In this case, the virtual sessions may be separated by a time gap (e.g., 5 minutes, 10 minutes, 15 minutes, 20 minutes, and so on). The electronic invitation associated with the aggregated virtual session may include session information for each of the plurality of virtual sessions, such that the client device associated with the user may automatically connect to the plurality of virtual sessions via the aggregated virtual session. In some examples, the user may not need to manually instruct the client device to join all of the individual virtual sessions separately, but rather may instruct the client device to join the aggregated virtual session once, which may include the plurality of virtual sessions. As a result, the user does not need to juggle between different electronic invitations associated with different virtual sessions, which may reduce a likelihood of the user joining a later virtual session late, and which may improve a user experience.

In some implementations, when a first virtual session runs late and the user is expected to join a second virtual session late, or the user is running behind and is expected to join the second virtual session late, a recording of the second virtual session may be captured. Rather than immediately joining the second virtual session late when the user is ready to join (e.g., 15 minutes late), the user may instruct the client device to initiate playback of the recording of the second virtual session. The playback may be initiated at a beginning of the recording, which may correspond to a beginning of the second virtual session. In some implementations, the playback of the recording may occur at an increased playback speed (e.g., 1.5×), which may allow the user to reach a live time point of the second virtual session. As a result, the user may consume the recording of the second virtual session at the increased playback speed, such that the user becomes aware of the topics or points of order discussed during the beginning of the virtual session, and the user may be able to reach the live time point of the second virtual session.

Previous solutions have not addressed the problem of establishing virtual sessions efficiently. Users are often tasked with managing different electronic invitations for different virtual sessions. Different virtual sessions are often organized by separate users, so different virtual sessions may often be associated with different session information. In previous solutions, a user may have accessed an electronic calendar and opened a first electronic invitation associated with a first virtual session. The user may have selected an electronic link included in the first electronic invitation to join the first virtual session. After the first virtual session ended, the user may have accessed the electronic calendar and opened a second electronic invitation associated with a second virtual session. The user may have selected an electronic link included in the second electronic invitation to join the second virtual session. Previous solutions do not provide an efficient mechanism for transitioning between separate virtual sessions. Further, previous solutions do not provide a mechanism for the user to consume a recording of a virtual session when joining the virtual session late within an aggregated virtual session.

FIGS. 1A-1E are diagrams of an example 100 associated with an aggregated virtual session for a plurality of virtual sessions. As shown in FIGS. 1A-1E, example 100 includes a first client device, a second client device, a third client device, a virtual session provider system, and a virtual session provider storage device. These devices are described in more detail in connection with FIGS. 2 and 3.

As shown in FIG. 1A, and by reference number 105, the first client device associated with a first user (User A) may transmit, to the virtual session provider system, an electronic request to establish the aggregated virtual session for a plurality of virtual sessions. The plurality of virtual sessions may be associated with a same video conferencing provider, or alternatively, the plurality of virtual sessions may be associated with different video conferencing providers. The electronic request may include an indication of the plurality of virtual sessions to be included in the aggregated virtual session. As described in further detail below, the aggregated virtual session may enable the first client device to connect to the plurality of virtual sessions.

In some implementations, the plurality of virtual sessions may include consecutive or back-to-back virtual sessions. Additionally, or alternatively, the plurality of virtual sessions may include non-consecutive virtual sessions. Thus, in some implementations, the plurality of virtual sessions may include a combination of consecutive virtual sessions and non-consecutive virtual sessions. The first client device may initiate the electronic request to establish the aggregated virtual session due to a limited amount of time between each of the plurality of virtual sessions. The first client device may initiate the electronic request so the first user may avoid manually connecting to each of the plurality of virtual sessions, which may enable the first user to spend time performing other tasks, such as preparing for a next virtual session, making a phone call or responding to an electronic message prior to the next virtual session, etc. This may improve a user experience and may conserve computing resources (e.g., memory resources, processing resources, server calls, etc.) that would otherwise be consumed searching for electronic invitations for each virtual session.

As an example, the first user may view an electronic calendar associated with the first user. The electronic calendar may indicate that the first user is scheduled for three consecutive virtual sessions in the morning. The three consecutive virtual sessions may include a first virtual session between 12 PM and 1 PM, a second virtual session between 1 PM and 2 PM, and a third virtual session between 2 PM and 3 PM. In this example, since transitioning between the back-to-back virtual sessions may be difficult and may increase a likelihood that the first user attends the second virtual session and/or the third virtual session late, the first user may initiate an electronic request via the first client device to establish an aggregated virtual session for the three consecutive virtual sessions.

As another example, the first user may view the electronic calendar associated with the first user. The electronic calendar may indicate that the first user is scheduled for three virtual sessions in the afternoon. The three virtual sessions may include a first virtual session between 1 PM and 2 PM, a second virtual session between 2 PM and 2:50 PM, and a third virtual session between 3 PM and 4 PM. In this example, the first user may initiate an electronic request via the first client device to establish an aggregated virtual session for the three virtual sessions, which may enable the first user to seamlessly transition between the first virtual session and the second virtual session which are consecutive in time, and may provide the first user with additional time between the second virtual session and the third virtual session.

In some implementations, the first user may interact with a calendar application that executes on the first client device. The first user may select, via the calendar application, the plurality of virtual sessions to be aggregated and form the aggregated virtual session. The calendar application may provide a graphical interface that allows the first user to select the plurality of virtual sessions.

In some implementations, the virtual session provider system and/or the first client device may analyze the electronic calendar associated with the first user and automatically recommend the plurality of sessions to be aggregated to form the aggregated virtual session. For example, the virtual session provider system and/or the first client device may identify, from the electronic calendar, virtual sessions that are back-to-back or consecutive with no time gap between the virtual sessions, and/or virtual sessions that are separated by less than a threshold amount of time, such as 15 minutes or less. The first client device may present a recommendation to aggregate certain virtual sessions, and the first client device may accept the recommendation by transmitting the electronic request to the virtual session provider system.

In some implementations, the first client device may transmit user preferences to the virtual session provider system. The user preferences may define criteria for aggregating certain virtual sessions. For example, the user preferences may define that virtual sessions that are back-to-back or consecutive with no time gap between the virtual sessions, and/or virtual sessions that are separated by less than a threshold amount of time, are to be automatically aggregated by the virtual session provider system to form the aggregated virtual session.

In some implementations, the virtual session provider system may not explicitly receive the electronic request from the first client device. Rather, the virtual session provider system may preemptively retrieve the electronic calendar associated with the first user. The virtual session provider system may preemptively retrieve the electronic calendar from the virtual session provider storage device. The virtual session provider system may analyze calendar entries on the electronic calendar for a particular day or time period, and the virtual session provider system may identify a plurality of virtual sessions from the electronic calendar. For example, the virtual session provider system may identify a plurality of consecutive virtual sessions from the electronic calendar associated with the first user. As another example, the virtual session provider system may identify, from the electronic calendar associated with the first user, a plurality of virtual sessions that are separated by time durations that satisfy a threshold. For example, each of the plurality of virtual sessions may be separated by another virtual session by less than (or less than or equal to) a defined period of time. The defined period of time may be 5 minutes, 10 minutes, 15 minutes, 20 minutes, etc. In some implementations, the virtual session provider system may automatically generate an electronic invitation to join an aggregated virtual session for the plurality of virtual sessions, as retrieved from the electronic calendar associated with the first user.

In some implementations, the virtual session provider system may analyze the calendar entries on the electronic calendar for the particular day or time period, and the virtual session provider system may identify the plurality of virtual sessions from the electronic calendar. In this example, the virtual session provider system may transmit a notification to the first client device, where the notification may indicate that the plurality of virtual sessions have been identified from the electronic calendar. The notification may query the first user on whether to create the electronic invitation to join the aggregated virtual session. If the first user indicates that the electronic invitation for the aggregated virtual session should be created, the virtual session provider system may generate the electronic invitation to join the aggregated virtual session for the plurality of virtual sessions.

As shown by reference number 110, the virtual session provider system may retrieve session information associated with the plurality of virtual sessions. The virtual session provider system may retrieve the session information associated with the plurality of virtual sessions indicated in the electronic request received from the first client device. The virtual session provider system may retrieve the session information from the virtual session provider storage device. The virtual session provider storage device may be associated with or accessible to the virtual session provider system. In some implementations, the virtual session provider system may retrieve the session information from an electronic calendar stored at the virtual session provider storage device, where the electronic calendar may be associated with the first user (e.g., using a credential of the first user).

In some implementations, the session information associated with the plurality of virtual sessions may include session information for each virtual session in the plurality of virtual sessions. For example, session information associated with a virtual session may include a scheduled start time associated with the virtual session, a scheduled end time associated with the virtual session, time zone information associated with the scheduled start time and the scheduled end time, an electronic link associated with the virtual session, and/or login information including a dial-in number, a password, and/or a personal identification number (PIN) associated with the virtual session.

In example 100, the session information may include session information associated with three separate virtual sessions. The session information may include first session information associated with a first virtual session, second session information associated with a second virtual session, and third session information associated with a third virtual session. The first session information may include a scheduled start time and a scheduled end time (e.g., 12 PM and 1 PM, respectively) associated with the first virtual session, and a first electronic link (e.g., a first uniform resource locator (URL)) associated with the first virtual session. The second session information may include a scheduled start time and a scheduled end time (e.g., 1 PM and 2 PM, respectively) associated with the second virtual session, and a second electronic link (e.g., a second URL) associated with the second virtual session. The third session information may include a scheduled start time and a scheduled end time (e.g., 2 PM and 3 PM, respectively) associated with the third virtual session, and a third electronic link (e.g., a third URL) associated with the third virtual session.

In one example, the first and second electronic links may be a session identifier, a user identifier, or another identifier that enables the first and second virtual sessions, respectively, to be joined from an application executed on the first client device. In other words, in this example, the first client device may connect to the first and second virtual sessions using a non-URL-based implementation.

As shown in FIG. 1B, and by reference number 115, the virtual session provider system may generate or create an electronic invitation to join the aggregated virtual session associated with the plurality of virtual sessions. The virtual session provider system may generate the electronic invitation based on the session information associated with each of the plurality of virtual sessions. In other words, the electronic invitation may include or be associated with the session information associated with each of the plurality of virtual sessions. In some implementations, the electronic invitation may include a list of attendees for each of the plurality of virtual sessions. Additionally, or alternatively, the electronic invitation may include a URL (e.g., a parent URL) that is associated with each individual URL (e.g., each child URL) of each individual virtual session. In this example, the virtual session provider system may store, in a data structure, information that indicates an association between the parent URL and each child URL to allow the client device to automatically join each virtual session. In some implementations, the data structure may also store information that indicates a start time and/or an end time associated with each child URL (e.g., each virtual session corresponding to each child URL) to enable the client device to automatically join each virtual session at the appropriate time.

In some implementations, the virtual session provider system may generate a user-specific URL for each user and aggregated virtual session. The virtual session provider system may generate a unique URL for each user and aggregated virtual session. In one example, two users may join different combinations of virtual sessions (e.g., completely separate virtual sessions, or one virtual session in common and other virtual sessions not in common) in the aggregated virtual session, so the virtual session provider system may generate unique URLs for those users in order for the users to join a correct combination of virtual sessions. In another example, when two users are attending an exact same set of virtual sessions (e.g., of a virtual conference), the virtual session provider system may generate unique URLs for each user, which may allow the virtual session provider system to potentially associate login credentials for a user with the parent URL.

In some implementations, the data structure may include the login credentials associated with the unique URL, where the login credentials may include a username and password. The login credentials may be different for different virtual sessions, similar to different start times and end times associated with each virtual session. The login credentials may be pulled from individual electronic invitations associated with the virtual sessions, and may be input into an application programming interface (API) or some input field(s) to automatically join the virtual session using the login credentials at an appropriate time.

In some implementations, the virtual session provider system may generate a same URL or a common URL for different users joining a same combination of virtual sessions (e.g., the different users may join a same aggregated virtual session). In this case, a virtual session may not be associated with login credentials, so different users may join using the same URL. The virtual session provider system may, after receiving the electronic request or automatically determining to generate the aggregated virtual session, determine whether an aggregated virtual session for this combination of virtual meetings (e.g., same URL, start time, end time, and login credentials) has already been created. When the aggregated virtual session for this combination of virtual meetings has already been created, the virtual session provider system retrieve a common URL associated with the aggregated virtual session. When the aggregated virtual session for this combination of virtual meetings has not been created, the virtual session provider system generate a new URL associated with the aggregated virtual session.

In continuing with the above example, the electronic invitation may include or be associated with the first session information, the second session information, and the third session information corresponding to the first virtual session, the second virtual session, and the third virtual session, respectively.

As shown by reference number 120, the virtual session provider system may transmit the electronic invitation to the first client device. The electronic invitation may be associated with the aggregated virtual session associated with the plurality of virtual sessions. The electronic invitation may include the common URL or the unique URL to join the aggregated virtual session. The electronic invitation may include an option to accept, tentatively accept, decline, or tentatively decline the electronic invitation. In some implementations, when the electronic invitation is declined, individual virtual sessions associated with the electronic invitation may be unaffected. In other words, the first client device may still join the individual virtual sessions manually when the electronic invitation corresponding to the aggregated virtual session is declined.

As an example, the first client device may receive, in association with an account of the first user (e.g., an account of an email application and/or a calendar application), a first electronic invitation for a first virtual session, a second electronic invitation for a second virtual session, and a third electronic invitation for a third virtual session. The first client device may output these electronic invitations for display to the first user, and the first user may interact with the first client device to accept the first electronic invitation, the second electronic invitation, and the third electronic invitation. Subsequently, the first client device may receive the electronic invitation to join an aggregated virtual session that includes the first virtual session, the second virtual session, and the third virtual session. If the user declines the electronic invitation, or initially accepts and then declines the electronic invitation, then the first electronic invitation, the second electronic invitation, and the third electronic invitation may still be valid and may be associated with an electronic calendar of the first user.

As shown by reference number 125, the first client device may transmit a selection of the electronic invitation to the virtual session provider system. In other words, the first user may, via the first client device, accept the electronic invitation, and an indication of the acceptance of the electronic invitation may be transmitted to the virtual session provider system.

As shown by reference numbers 130, the virtual session provider system may establish the aggregated virtual session based on the electronic invitation. The aggregated virtual session may enable the first client device to connect to each of the plurality of virtual sessions associated with the aggregated virtual session (e.g., by creating a single URL that enables access to multiple virtual sessions via corresponding URLs).

In some implementations, when the first user accepts the aggregated virtual session, the calendar application associated with an account of the first user may replace the multiple virtual sessions on the electronic calendar of the first user with the single aggregated virtual session. For example, rather than displaying three individual blocks of time for three separate virtual sessions, the calendar application may provide one block of time associated with the single aggregated virtual session for display. The single block of time may have sub-blocks or other information indicating that the single block of time corresponds to an aggregation of multiple virtual sessions, as well as start times and end times associated with individual virtual sessions.

In some implementations, the calendar application may provide a graphical representation of the aggregated virtual session for display. The graphical representation may be same or different from graphical representations of individual virtual sessions. For example, the graphical representation of the aggregated virtual session may be associated with different colors, different borders, different fonts, etc., as compared to the graphical representations of individual virtual sessions. Further, the graphical representation of the aggregated virtual session may include graphical indications or representations of child virtual sessions included in the aggregated virtual session.

As shown by reference number 135, the first client device may connect to the aggregated virtual session using the electronic invitation. After connecting to the aggregated virtual session, the virtual session provider system may establish a connection between the first client device and each of the plurality of virtual sessions associated with the aggregated virtual session, which may be transparent to the first client device. In other words, the first client device may be unaware of actions performed at the virtual session provider system to establish connections between the first client device and the plurality of virtual sessions associated with the aggregated virtual session, or transitioning between individual virtual sessions associated with the aggregated virtual session, after the first client device connects to the aggregated virtual session. The aggregated virtual session may enable the first client device to connect to each of the plurality of virtual sessions automatically, without the first client device manually joining each individual virtual session separately.

In some implementations, the virtual session provider system may automatically direct the first client device to a URL associated with a next virtual session, or prompt the first user as to whether to redirect the first client device to the URL associated with the next virtual session. In some implementations, the virtual session provider system may receive an indication based on user input that a prior virtual session has ended at an appropriate time, and that the first client device is to be redirected to the URL associated with the next virtual session. The virtual session provider system may store URL information, login credentials, etc. associated with the virtual sessions in the data structure, and the virtual session provider system may transition between virtual sessions of the aggregated virtual session using stored information from the data structure.

In some implementations, the virtual session provider system may automatically direct the first client device to the URL associated with the next virtual session based on analyzing audio or other information from an earlier virtual session. For example, when a first virtual session has no audio (or audio that is below a threshold), the virtual session provider system detects certain words or phrases that are spoken (e.g., "bye"), and/or when some or all or a threshold number of users have dropped off the first virtual session, the virtual session provider system may automatically direct the first client device to a URL associated with a second virtual session.

In some implementations, the virtual session provider system may provide a mechanism (e.g., an input button) to switch back to a previous virtual session in case a switchover happens by mistake. In this case, if the virtual session provider system automatically directs the first client device to the URL associated with the second virtual session by mistake, the virtual session provider system may redirect the first client device back to the first virtual session.

In some implementations, the first client device may launch a video session application on the first client device, and connect to the aggregated virtual session associated with the plurality of virtual sessions. In this example, the video session application may be associated with a single video conferencing provider, and each of the plurality of virtual sessions may be associated with the single video conferencing provider. In some implementations, different virtual sessions associated with the aggregated virtual session may be associated with different video conferencing providers. In this case, the first client device may launch a video session application associated with a particular video conferencing provider, prior to connecting to a specific virtual session in the aggregated virtual session. The first client device may automatically launch another video session application associated with another video conferencing provider, prior to connecting to another virtual session in the aggregated virtual session. For example, the virtual session provider system may redirect the first client device to a URL associated with a virtual session of the other video conferencing provider at an appropriate time.

In some implementations, the plurality of virtual sessions associated with the aggregated virtual session may include a first virtual session and a second virtual session. The virtual session provider system may establish a first connection for the first client device with the first virtual session associated with the aggregated virtual session based on the electronic invitation. The virtual session provider system may establish the first connection with the first virtual session based on first session information (e.g., a URL, login information, and/or password information) associated with the electronic invitation, where the first session information may be associated with the first virtual session. The virtual session provider system may determine, based on an indication received from the first client device, that the first virtual session is expected to end at a scheduled end time associated with the first virtual session. For example, the first client device may transmit the indication to the virtual session provider system, to indicate that the first virtual session has ended. As another example, the first client device may transmit an indication that the first virtual session has ended and that the second virtual session should be initiated. In some implementations, the virtual session provider system may wait to receive the indication that the first virtual session has ended, so that the virtual session provider system does not transition to the second virtual session prematurely. The virtual session provider system may establish a second connection for the first client device with the second virtual session associated with the aggregated virtual session. The virtual session provider system may establish the second connection with the second virtual session based on second session information associated with the electronic invitation, where the second session information may be associated with the second virtual session. The virtual session provider system may establish the second connection at a scheduled start time (or at a time that a user indicates that the first virtual session is done, which could be a few minutes before or after the scheduled start time) associated with the second virtual session, as indicated by the second session information associated with the electronic invitation.

In some implementations, the virtual session provider system may detect that session information associated with the a virtual session has been updated. For example, a scheduled start time associated with the virtual session may be changed, a scheduled end time associated with the virtual session may be changed, or the virtual session may be canceled. The virtual session provider system may update the aggregated virtual session to be associated with the updated session information. For example, the virtual session provider system may update the session information associated with the electronic invitation, which may cause the aggregated virtual session to be updated to incorporate the updated session information.

As shown by reference numbers 140, the plurality of virtual sessions associated with the aggregated virtual session may include a first (e.g., earlier) virtual session and a second (e.g., later) virtual session, and the virtual session provider system may detect that the first virtual session is expected to end after (e.g., later than) a scheduled end time associated with the first virtual session. For example, the first client device (e.g., autonomously or based on user input) may transmit an indication to the virtual session provider system to indicate that the first virtual session is expected to end after the scheduled end time. As another example, the first client device may be instructed to transmit an indication to the virtual session provider system to indicate when the first virtual session has ended, and at a scheduled end time of the first virtual session, the virtual session provider system may detect that the indication has not yet been received from the first client. Based on the lack of receipt of the indication, the virtual session provider system may determine that the first virtual session is expected to end after the scheduled end time.

As shown by reference numbers 145, the virtual session provider system may record or instruct another device to record the second virtual session beginning at a scheduled start time associated with the second virtual session, when the first virtual session is detected as being expected to end after the scheduled end time. The virtual session provider system may store or may instruct another device to store the recording of the second virtual session at the virtual session provider storage device. In some implementations, the virtual session provider system may initiate the recording of the second virtual session to be captured beginning at the scheduled start time associated with the second virtual session. In some implementations, to initiate the recording of the second virtual session, the virtual session provider system may access session information associated with the second virtual session in the electronic invitation, which may enable the virtual session provider system to connect to the second virtual session and begin the recording of the second virtual session on behalf of the first client device.

As shown by reference numbers 150, the virtual session provider system may transmit, to the first client device, an electronic link to the recording of the second virtual session. The electronic link may be a URL or another identifier that enables the first client device to access the recording of the second virtual session stored on the virtual session provider storage device.

As shown by reference number 155, the virtual session provider system may transmit, to the first client device, an indication to begin playback of the recording. In some implementations, the indication to begin playback may include an indication to begin the playback at a point in time that starts after an initial time period, and/or may include an indication of a playback speed for the recording. For example, the virtual session provider system may detect that an initial time period of the second virtual session is associated with an amount of voice activity that does not satisfy a defined threshold. The virtual session provider system may detect that the initial time period of the second virtual session (e.g., a first five minutes) is associated with no voice activity or minimal voice activity. The virtual session provider system may determine that the initial time period of the second virtual session may be skipped when the first user is consuming the recording of the second virtual session. An ability for the first user to skip over less important portions of the second virtual session may be useful when the first user begins consuming the recording of the second virtual session late (e.g., after the second virtual session has already begun). The virtual session provider system may transmit, to the first client device, the indication to begin playback of the recording from after the initial time period (e.g., may indicate a timestamp or other point in the recording at which the first client device is to begin playing the recording), which may enable the first client device to skip over the initial time period of the recording that is associated with no or minimal voice activity.

As an example, the first user may be provided with an option to skip a start or end of the second virtual session based on no or minimal voice activity associated with the second virtual session. Further, the first user may be provided with an option to skip the start or end of the second virtual session based on detected words (e.g., "bye"). As another example, the first user may specify a specific skip time (e.g., five minutes) for a start and/or an end of the second virtual session.

In some implementations, the virtual session provider system may detect other data associated with the second virtual session, such as screen sharing data. The virtual session provider system may determine whether or not to skip a time period of the second virtual session based on the other data. For example, a presenter may share a presentation as part of the second virtual session. As part of the presentation, the presenter may instruct an audience to perform a hands-on task, during which the presenter does not speak for a certain period of time. By using screen sharing data, the virtual session provider system may not inadvertently determine that a portion of the second virtual session may be skipped due to minimal voice activity when the audience is performing the task.

As an example, the virtual session provider may detect that the first client device joins the second virtual session ten minutes after a scheduled start time of the second virtual session. The virtual session provider may detect that a first five minutes of a recording of the second virtual session has minimal voice activity, as users are waiting for other users to join. As a result, the virtual session provider may determine that the first user may skip the first five minutes of the recording of the second virtual session. The virtual session provider may transmit an indication, to the first client device, that enables the first client device to initiate playback of the recording of the second virtual session beginning at a five-minute time point. As a result, the first user may avoid consuming the first five minutes of the recording of the second virtual session during which no substantive discussion occurred.

As described above, in some implementations, the virtual session provider system may transmit, to the first client device, an indication of a playback speed to be used for playback of the recording. The virtual session provider system may determine the playback speed to enable the first client device to reach a live time point in the second virtual session, and the virtual session provider system may transmit the indication of the playback speed to the first client device. The playback speed may be an increased playback speed (e.g., a 1.5× playback speed as compared to a 1× playback speed), which may enable the first client device to reach the live time point in the second virtual session.

In some implementations, the virtual session provider system may determine the increased playback speed based on a time duration between a scheduled start time of the second virtual session and a start time at which the recording of the second virtual session is played back at the first client device. In other words, the virtual session provider system may determine the increased playback speed based on a time difference between the scheduled start time of the second virtual session (e.g., 2:00 PM) and an actual start time at which the playback of the recording of the second virtual session is initiated (e.g., 2:10 PM).

As an example, the virtual session provider system may detect that the first client device joins the second virtual session ten minutes after a scheduled start time of the second virtual session. The virtual session provider system may determine an increased playback speed of 1.5× for the first client device to reach a live time point in the second virtual session in an amount of time that satisfies a threshold. The virtual session provider may transmit an indication, to the first client device, that enables the first client device to initiate playback of the recording of the second virtual session with the increased playback speed of 1.5×. In this example, the first client device may start playing the recording of the second virtual session ten minutes after the scheduled start time, and with the increased playback speed of 1.5×. In this example, the first client device may reach the live time point in the second virtual session after 20 minutes of consuming the recording at the increased playback speed of 1.5×. After 20 minutes at the increased playback speed of 1.5×, the first client device may reach a 30-minute time point in the recording of the second virtual session, which may correspond to the live time point in the second virtual session (since the first user was ten minutes late to the second virtual session). In some cases, when the first user reaches the live time point, the first client device may stop receiving the recording of the second virtual session, and may instead connect to a live stream associated with the second virtual session.

In some implementations, the first client device may initially be directed to a first URL that streams a recording of a virtual session at an increased layback speed, and then the first client device may be redirected to a second URL associated with a live stream of the virtual session. The live stream of the virtual session may be ongoing, and may be recorded into a recorded stream that streams via the first URL. When the first client device reaches an end of the recording, which may occur because playback of the recording may be faster than a stream being generated for that recording, the first client device may notify the server and the server may redirect the client to the second URL associated with the live stream of the virtual session. In some implementations, the server may detect that the first client device has reached the end of the recording, and the server may redirect the client to the second URL associated with the live stream of the virtual session. In some implementations, the first user may be presented with an option to switch over to the live stream of the virtual session, including when the first user is caught up with the recording.

As another example, the virtual session provider system may determine the increased playback speed based on an amount of time elapsed in the virtual session when the first user joins the virtual session. The virtual session provider system may store information in the data structure that defines a playback speed corresponding to a time range. The data structure may store a first time range and a corresponding playback speed, a second time range and a corresponding playback speed, and so on. For example, the increased playback speed may be 1.2× when one to five minutes of the virtual session have elapsed, the increased playback speed may be 1.5× when five to ten minutes of the virtual session have elapsed, and so on, as indicated by the data structure.

In some implementations, the virtual session provider system may determine a time point within the second virtual session to be associated with a particular portion of the second virtual session. The particular portion of the second virtual session may be a portion that may be of importance to the first user, such as an interactive portion, a question-and-answer session, or a live demo portion. In some implementations, the virtual session provider system may receive, from a second client device associated with a presenter of the second virtual session, an indication of the time point within the second virtual session to be associated with the particular portion of the second virtual session. In some implementations, the time point within the second virtual session to be associated with the particular portion may be determined based on information associated with the second virtual session, such as a session agenda or session notes, which may be included in session information associated with the second virtual session. The time point may be extracted from the information using natural language processing, a keyword search, or related techniques. The virtual session provider system may set the increased playback speed based on a period of time between the first virtual session ending and the time point within the second virtual session to be associated with the particular portion.

As an example, the virtual session provider system may receive an indication, from the second client device, that a question and answer session begins at a 30-minute time point of the second virtual session. The first user may be 15 minutes late to the second virtual session. In other words, the first client device may start playing the recording of the second virtual session 15 minutes after the scheduled start time. The virtual session provider system may determine an appropriate increased playback speed (e.g., an increased playback speed of 2×) to enable the first client device to reach a live time point associated with the question and answer session in the second virtual session.

As shown by reference number 160, the first client device may initiate playback of the recording of the second virtual session, as described above. For example, the first client device may initiate the playback of the recording beginning from the initial time period and/or at the increased playback speed, based on the indication received from the virtual session provider system. In some implementations, the first client device may play back the recording at an increased playback speed based on an instruction received from the first user. For example, the first user may instruct the first client device to play back the recording at a playback speed of 1.2×, which may be a desired playback speed for the first user.

In some implementations, the virtual session provider system may receive, from the first client device, an indication to skip a virtual session, which may include a request to record the virtual session. The virtual session provider system may record or instruct another device to record the virtual session beginning at a scheduled start time associated with the virtual session. The virtual session provider system may transmit, to the first client device, an electronic link to the recording of the virtual session for playback. As a result, the first user may initiate the playback of the recording of the virtual session at a later time.

In some implementations, the virtual session provider system may identify, from the electronic calendar associated with the first user, an overlapping virtual session that overlaps in time with at least one of the plurality of virtual sessions. The virtual session provider system may record or instruct another device to record the overlapping virtual session beginning at a scheduled start time associated with the overlapping virtual session. The virtual session provider system may transmit, to the first client device, an electronic link to the recording of the overlapping virtual session for playback.

As an example, the first user may wish to attend two separate virtual sessions with a same scheduled start time. Since the first user may not attend both virtual sessions simultaneously, the first user may initiate, via the first client device, a recording of one of the virtual sessions. As a result, the first user may initiate playback of the recording of one of the virtual sessions at a later time. As another example, the two virtual sessions may be overlapping when a first virtual session has a scheduled end time that is less than a scheduled start time of a second virtual session.

Figure 1D:
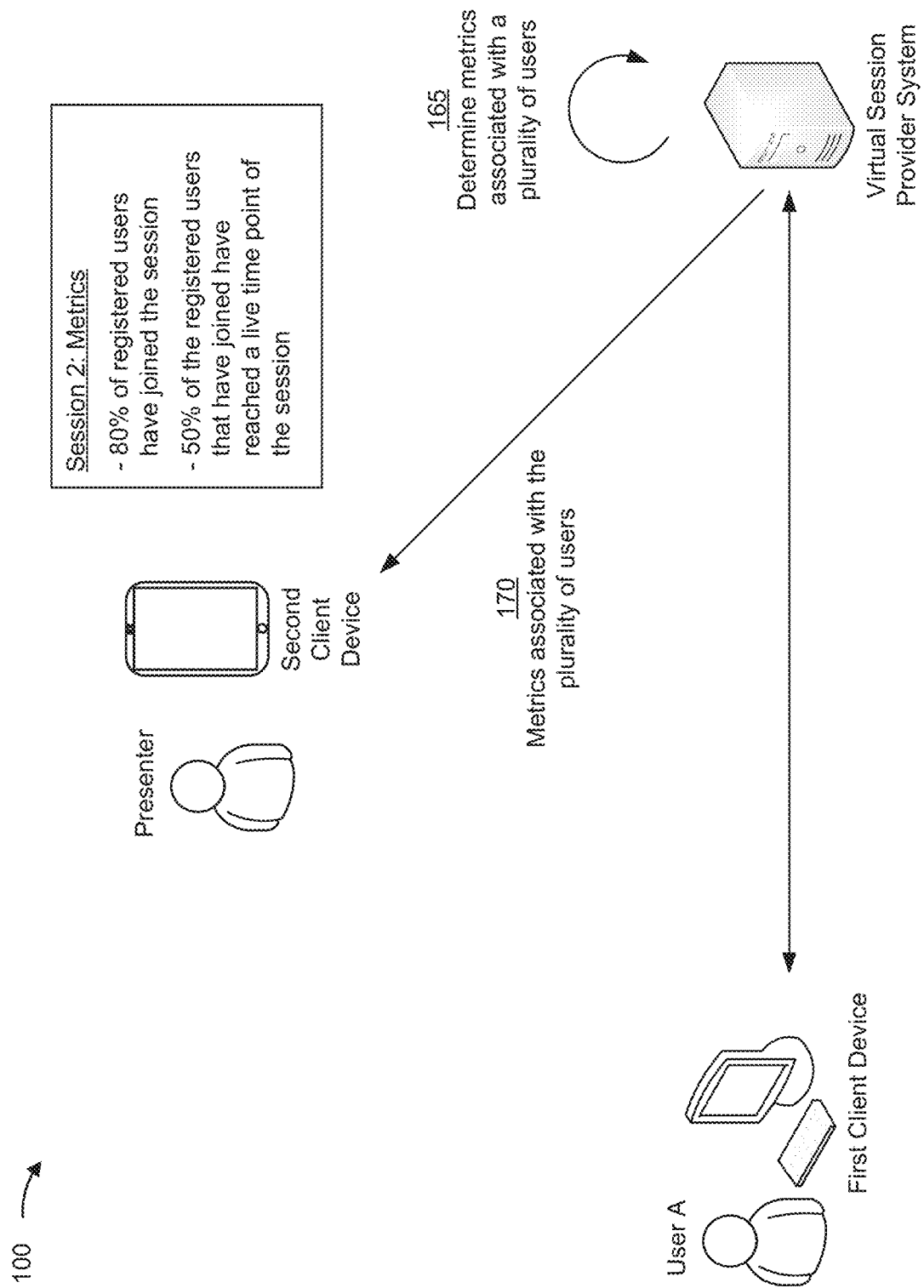

As shown in FIG. 1D, and by reference number 165, the virtual session provider system may determine a metric associated with a plurality of users. The virtual session provider system may determine the metric associated with the plurality of users attending a virtual session associated with the aggregated virtual session, such as the first virtual session and/or the second virtual session. The metric may indicate a portion of the plurality of users that have reached a live time point in the virtual session during a playback of the virtual session. For example, the metric may indicate that 80% of registered users have joined the virtual session, and that 50% of the registered users that have joined the virtual session have reached a live time point of the virtual session.

As shown by reference number 170, the virtual session provider system may transmit the metric to the second client device associated with the presenter of the virtual session. The second client device may display the metric for the presenter during a presentation of the virtual session, which may enable the presenter to tailor the presentation based on the metric. For example, the presenter may initially be five minutes away from beginning a live demo of a software tool, but based on the metric indicating the portion of the plurality of users that have reached a live time point in the virtual session during a playback of the virtual session, the presenter may begin the live demo in ten minutes, which may enable a greater number of users to have reached the live time point in the virtual session.

Figure 1E:
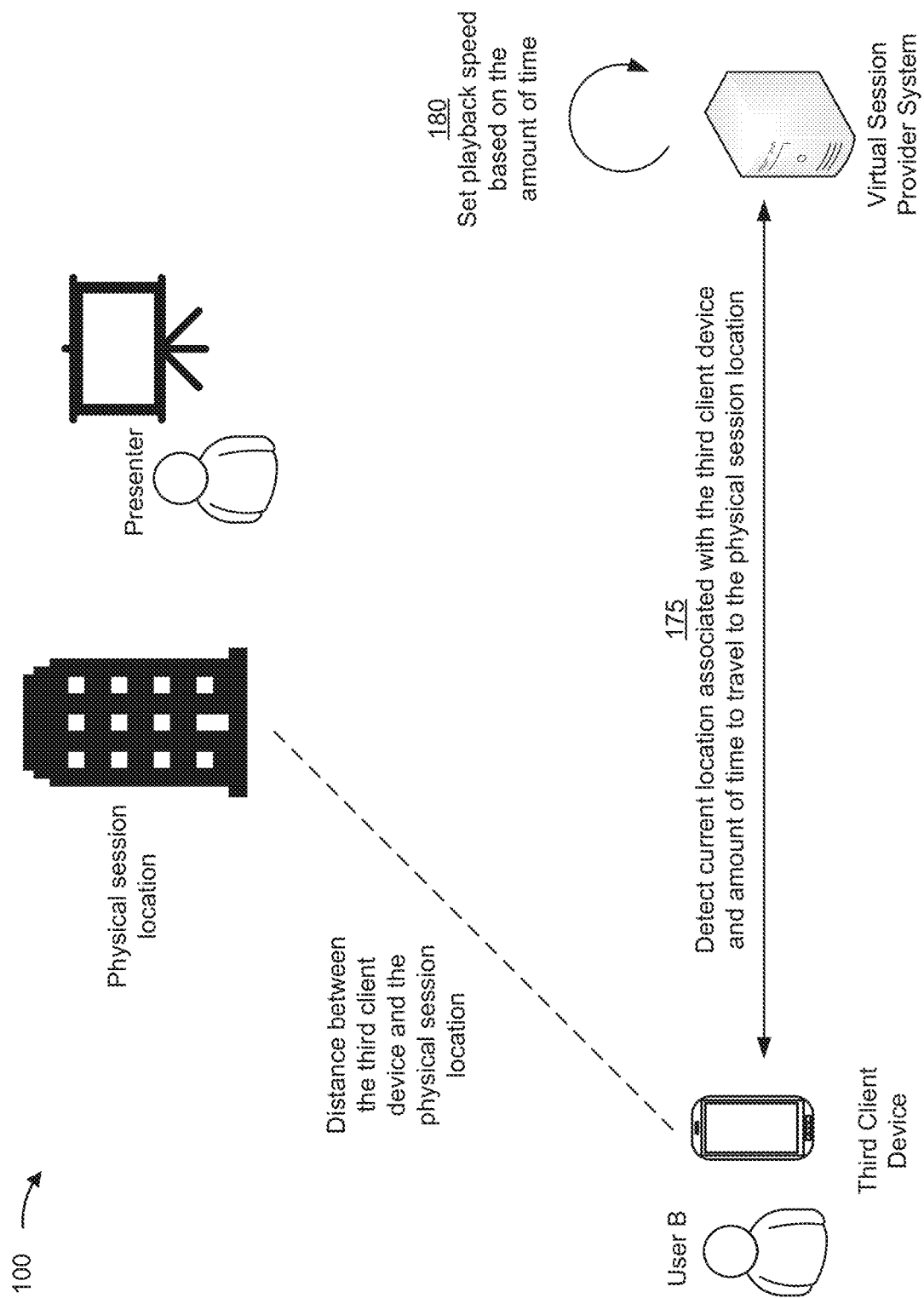

As shown in FIG. 1E, and by reference number 175, a virtual session may be associated with a physical session location, which may be a certain building, lecture hall, etc., in which a presenter may be giving a live presentation of the virtual session. The virtual session may have attendees in person, and/or may be viewed remotely via the virtual session provider system. A second user (User B) may attend the live presentation of the virtual session at the physical session location. In some implementations, the virtual session provider system may detect a current location associated with a third client device associated with the second user. For example, the current location may correspond to another physical session location of another virtual session, and the second user may plan to walk from the current location to the physical session location associated with the live presentation of the virtual session. The virtual session provider system may determine an amount of time for the second user associated with the third client device to travel between the current location and the physical session location associated with the live presentation of the virtual session.

In some implementations, the virtual session provider system may determine, based on the current location of the third client device associated with the second user, that the second user may not arrive at the physical session location by a scheduled start time associated with the live presentation of the virtual session (e.g., the second user may arrive ten minutes late to the live presentation). The virtual session provider system may determine an estimated time at which the second user is to arrive at the physical session location based on a distance between the current location and the physical session location, and/or an estimated amount of time to travel between the current location and the physical session location. In this case, the third client device may play a recording of the live presentation of the virtual session.

As shown by reference number 180, the virtual session provider system may determine an increased playback speed for playback of the recording of the live presentation of the virtual session. The increased playback speed may be determined based on the estimated time at which the second user is to arrive at the physical session location, which may correspond to how late the second user is to attend the live presentation of the virtual session. The increased playback speed may be determined to enable the second user to reach a live time point of the recording after arriving at the physical session location.

As an example, the second user may be traveling from a current location (e.g., a first physical session location) associated with a first live presentation to a second physical session location associated with a second live presentation. Based on a distance between the first physical session location and the second physical session location, the virtual session provider system may estimate that the second user will be 15 minutes late to the second live presentation. After the second user arrives at the second physical session location, rather than entering the second live presentation and being unaware of the discussion that occurred during the first 15 minutes of the second live presentation, the second user may access a recording of the second live presentation via the third client device. The recording may be played back at an increased playback speed, which may enable the second user to reach a live time point of the second live presentation, at which point the second user may enter the second live presentation and no longer consume the recording of the second live presentation.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
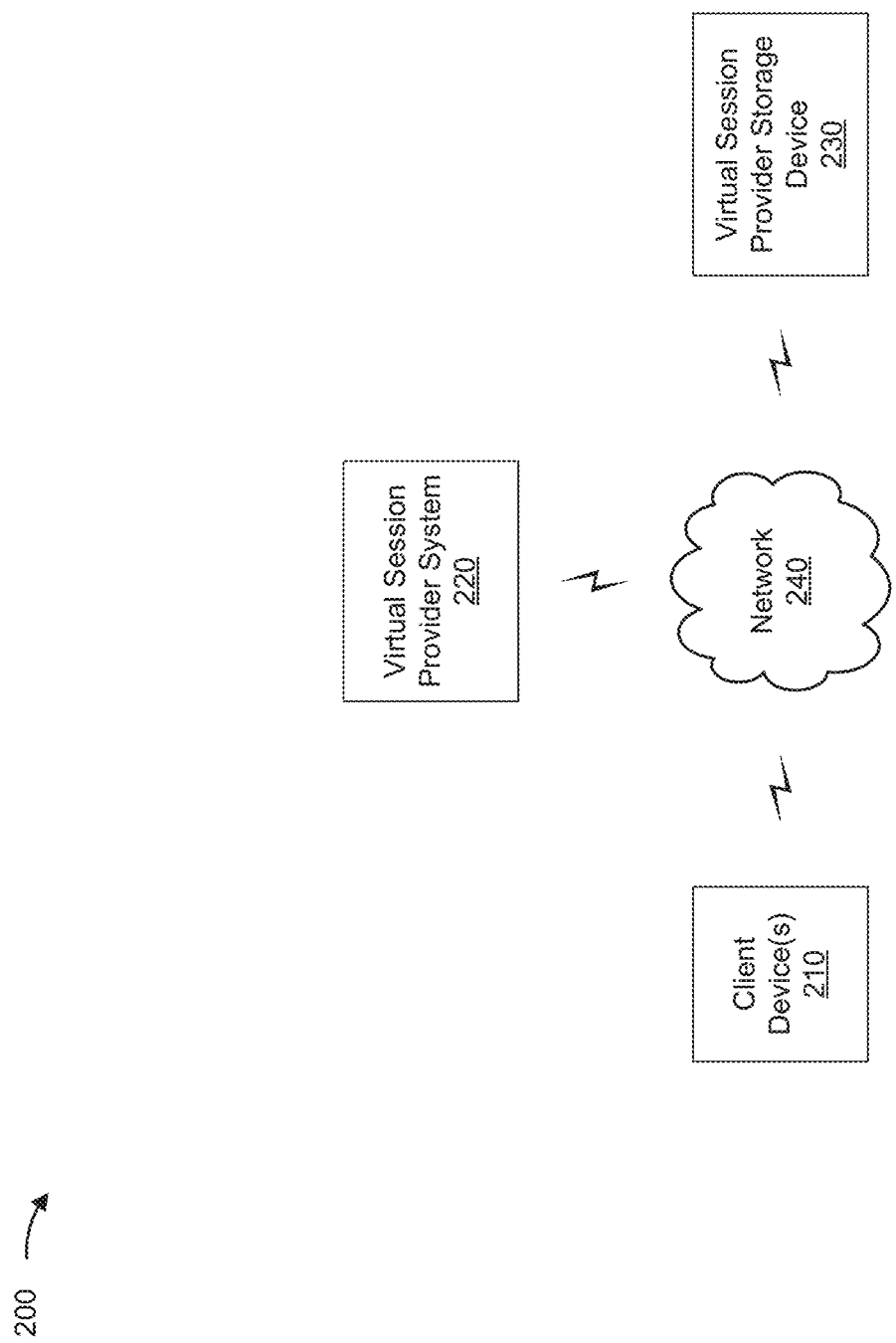
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device(s) 210, a virtual session provider system 220, a virtual session provider storage device 230, and a network 240. Devices of environment 200 may interconnect via wired connections, wireless connections, or a combination of wired and wireless connections.

The client device 210 includes one or more devices capable of receiving, generating, storing, processing, and/or providing information associated with establishing an aggregated virtual session, as described elsewhere herein. The client device 210 may include a communication device and/or a computing device. For example, the client device 210 may include a wireless communication device, a phone such as a smart phone, a mobile phone or a video phone, a user equipment, a laptop computer, a tablet computer, a desktop computer, or a similar type of device. In some implementations, the client device 210 may be used to connect to each of a plurality of virtual sessions associated with the aggregated virtual session.

The virtual session provider system 220 includes one or more devices capable of receiving, generating, storing, processing, providing, and/or routing information associated with establishing an aggregated virtual session, as described elsewhere herein. The virtual session provider system 220 may include a communication device and/or a computing device. For example, the virtual session provider system 220 may include a server, such as an application server, a client server, a web server, a database server, a host server, a proxy server, a virtual server (e.g., executing on computing hardware), or a server in a cloud computing system. In some implementations, the virtual session provider system 220 includes computing hardware used in a cloud computing environment.

The virtual session provider storage device 230 includes one or more devices capable of receiving, generating, storing, processing, and/or providing electronic calendar(s) associated with user(s) and recordings of virtual sessions, as described elsewhere herein. The virtual session provider storage device 230 may include a communication device and/or a computing device. For example, the virtual session provider storage device 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The virtual session provider storage device 230 may communicate with one or more other devices of environment 200, as described elsewhere herein.

The network 240 includes one or more wired and/or wireless networks. For example, the network 240 may include a cellular network, a public land mobile network, a local area network, a wide area network, a metropolitan area network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
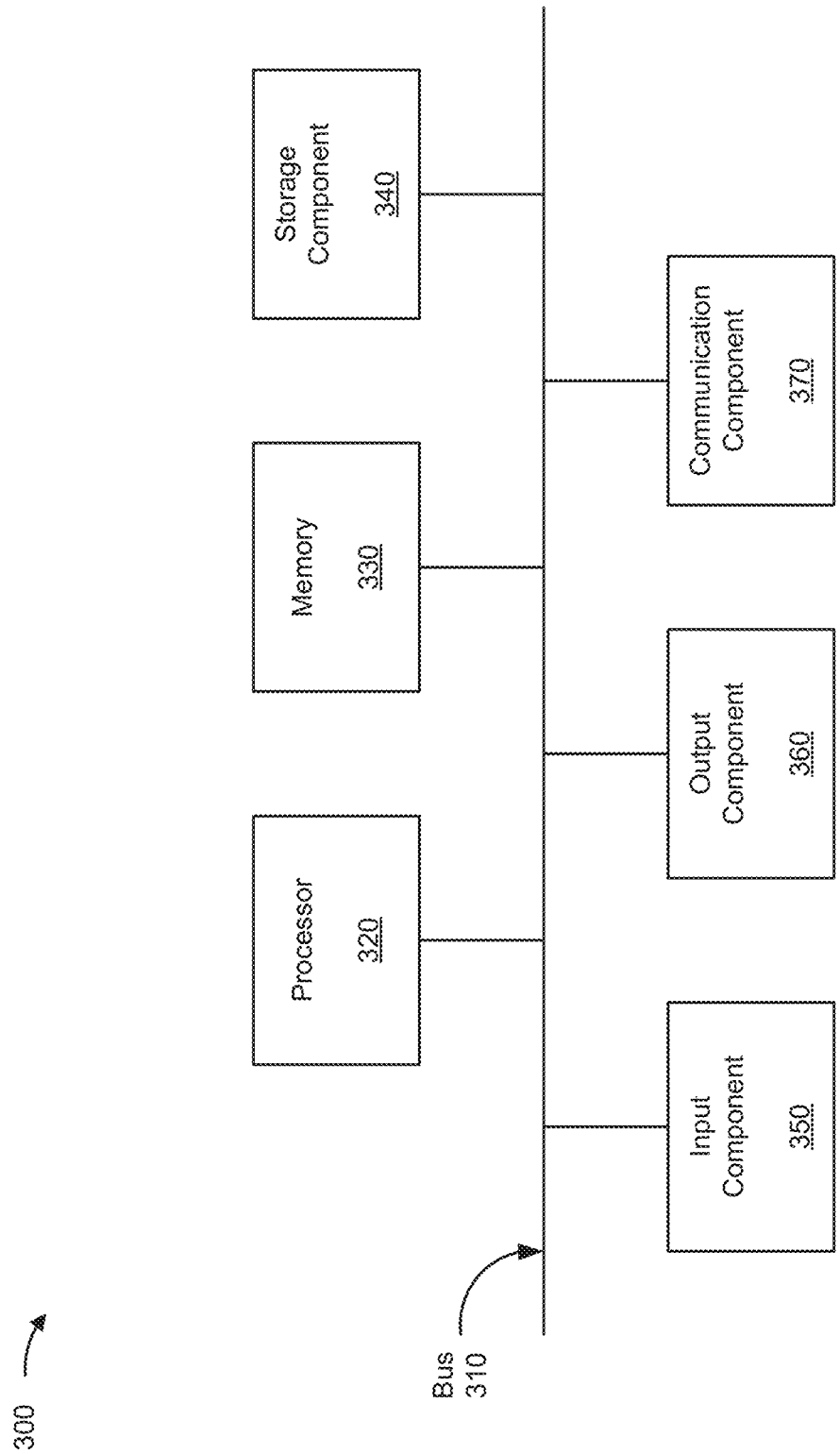
FIG. 3 is a diagram of example components of one or more devices of FIG. 2.

FIG. 3 is a diagram of example components of a device 300, which may correspond to the client device(s) 210, the virtual session provider system 220, and/or the virtual session provider storage device 230. In some implementations, the client device(s) 210, the virtual session provider system 220, and/or the virtual session provider storage device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
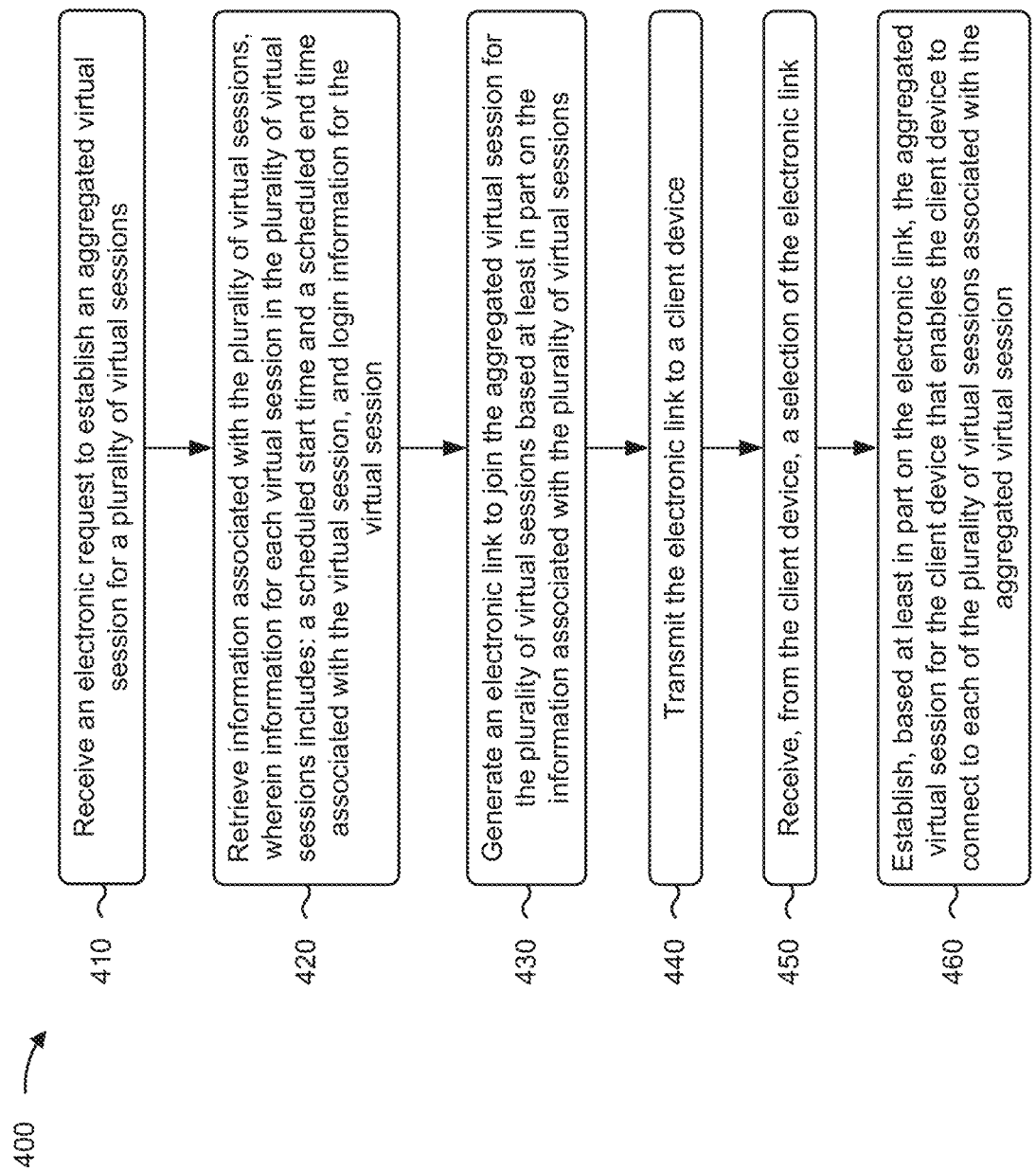
FIG. 4 is a flowchart of an example process relating to establishing an aggregated virtual session.

FIG. 4 is a flowchart of an example process 400 associated with establishing an aggregated virtual session. In some implementations, one or more process blocks of FIG. 4 may be performed by a system (e.g., client device(s) 210, virtual session provider system 220, and/or virtual session provider storage device 230). In some implementations, one or more process blocks of FIG. 4 may be performed by another device or a group of devices separate from or including the system, such as client device(s) 210, virtual session provider system 220, and/or virtual session provider storage device 230. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include retrieving an electronic calendar associated with a user (block 410). As further shown in FIG. 4, process 400 may include identifying, based on the electronic calendar, a plurality of virtual sessions (block 420). As further shown in FIG. 4, process 400 may include generating an electronic invitation to join an aggregated virtual session for the plurality of virtual sessions (block 430). As further shown in FIG. 4, process 400 may include transmitting the electronic invitation to a client device associated with the user (block 440). As further shown in FIG. 4, process 400 may include receiving, from the client device, a selection of the electronic invitation (block 450). As further shown in FIG. 4, process 400 may include establishing, based on the electronic invitation, the aggregated virtual session for the client device that enables the client device to connect to each of the plurality of virtual sessions associated with the aggregated virtual session (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of establishing an aggregated virtual session, comprising:
    sending, by a device, an electronic request to establish an aggregated virtual session for a plurality of virtual sessions that causes another device to retrieve session information associated with the plurality of virtual sessions;
    obtaining, by the device and based on the session information, an electronic invitation to join the aggregated virtual session for the plurality of virtual sessions;
    transmitting, by the device, a selection of the electronic invitation;
    causing, by the device and based on the selection, a calendar application associated with the device to replace blocks of time, associated with the plurality of virtual sessions, with a single block of time, associated with the aggregated virtual session for the plurality of virtual sessions, for display via the calendar application; and
    connecting, by the device and based on the selection, to the aggregated virtual session that enables the device to connect to each virtual session associated with the aggregated virtual session.

2. The method of claim 1, wherein a first virtual session, of the plurality of virtual sessions, is associated with a first video conferencing provider, and wherein a second virtual session, of the plurality of virtual sessions, is associated with a second video conferencing provider.

3. The method of claim 1, wherein the plurality of virtual sessions include one or more of:
consecutive virtual sessions, or
non-consecutive virtual sessions.

4. The method of claim 1, wherein sending the electronic request is based on an interaction with a calendar application that executes on the device.

5. The method of claim 1, further comprising:
transmitting criteria for aggregating virtual sessions, and
wherein the aggregated virtual session includes a subset of virtual sessions, of the plurality of virtual sessions, based on the criteria for aggregating virtual sessions.

6. The method of claim 1, wherein the electronic invitation includes a uniform resource location (URL) associated with a URL of each virtual session associated with the aggregated virtual session for the plurality of virtual sessions.

7. The method of claim 1, further comprising:
transmitting a user preference that defines a threshold amount of time between virtual sessions as a condition associated with aggregating virtual sessions; and
wherein the aggregated virtual session includes a subset of virtual sessions, of the plurality of virtual sessions, based on the user preference.

8. A device, comprising:
one or more memories; and
one or more processors, coupled to the one or more memories, configured to:
send an electronic request to establish an aggregated virtual session for a plurality of virtual sessions that causes another device to retrieve session information associated with the plurality of virtual sessions;
obtain, based on the session information, an electronic invitation to join the aggregated virtual session for the plurality of virtual sessions;
connect, based on the electronic invitation, to the aggregated virtual session that enables the device to connect to each virtual session associated with the aggregated virtual session; and
receive an option to start or end a virtual session associated with the aggregated virtual session based on a threshold level of voice activity associated with the virtual session.

9. The device of claim 8, wherein the electronic invitation includes one or more options including:
an option to accept the electronic invitation,
an option to tentatively accept the electronic invitation,
an option to decline the electronic invitation, or
an option to tentatively decline the electronic invitation.

10. The device of claim 8, wherein the one or more processors are further configured to:
receive input associated with the electronic invitation; and
display, via a calendar application that executed on the device, a single block of time, associated with the aggregated virtual session.

11. The device of claim 10, wherein the single block of time includes one or more sub-blocks associated with respective start times and end times associated with each virtual session associated with the aggregated virtual session.

12. The device of claim 8, wherein the one or more processors, when connecting to the aggregated virtual session, are configured to:
launch a first video session application associated with a first provider, and
launch a second video session application associated with a second provider.

13. The device of claim 8, wherein the one or more processors are further configured to:
transmit an indication that a first virtual session, associated with the aggregated virtual session, has ended; and
connect, based on the indication, to a second virtual session, associated with the aggregated virtual session.

14. The device of claim 8, wherein the one or more processors are further configured to:
transmit a user preference that defines a threshold amount of time between virtual sessions as a condition associated with aggregating virtual sessions; and
wherein the aggregated virtual session includes a subset of virtual sessions, of the plurality of virtual sessions, based on the user preference.

15. A non-transitory computer-readable medium storing a set of instructions, the set of instructions comprising:
one or more instructions that, when executed by one or more processors of a device, cause the device to:
send an electronic request to establish an aggregated virtual session for a plurality of virtual sessions that causes another device to retrieve session information associated with the plurality of virtual sessions;
obtain, based on the session information, an electronic invitation to join the aggregated virtual session for the plurality of virtual sessions;
connect, based on a selection of the electronic invitation, to the aggregated virtual session that enables the device to connect to each virtual session associated with the aggregated virtual session;
receive an electronic link to a recording of a virtual session, associated with the aggregated virtual session,
wherein an initial time period of the virtual session is associated with a threshold level of voice activity; and
receive an instruction to begin playback of the recording after the initial time period.

16. The non-transitory computer-readable medium of claim 15, wherein the one or more instructions further cause the device to:
autonomously transmit an indication to indicate that a first virtual session, associated with the aggregated virtual session, is to end after a scheduled end time associated with the first virtual session.

17. The non-transitory computer-readable medium of claim 16, wherein the one or more instructions further cause the device to:
receive an electronic link to a recording of a second virtual session, associated with the aggregated virtual session,
wherein the second virtual session is associated with a scheduled start time within a threshold period of time of the scheduled end time associated with the first virtual session.

18. The non-transitory computer-readable medium of claim 15, wherein the one or more instructions further cause the device to:
transmit a user preference that defines a threshold amount of time between virtual sessions as a condition associated with aggregating virtual sessions; and
wherein the aggregated virtual session includes a subset of virtual sessions, of the plurality of virtual sessions, based on the user preference.

19. The non-transitory computer-readable medium of claim 15, wherein the electronic request includes session information for a virtual session, of the plurality of virtual sessions, including one or more of:
    a scheduled start time associated with the virtual session,
    a scheduled end time associated with the virtual session,
    time zone information,
    a link associated with the virtual session, or
    login information associated with the virtual session.

20. The non-transitory computer-readable medium of claim 15, wherein the one or more instructions further cause the device to:
    cause, based on the selection, a calendar application associated with the device to replace blocks of time, associated with the plurality of virtual sessions, with a single block of time, associated with the aggregated virtual session for the plurality of virtual sessions, for display via the calendar application.

\* \* \* \* \*